United States Patent
Masumura et al.

(10) Patent No.: US 11,894,017 B2
(45) Date of Patent: Feb. 6, 2024

(54) VOICE/NON-VOICE DETERMINATION DEVICE, VOICE/NON-VOICE DETERMINATION MODEL PARAMETER LEARNING DEVICE, VOICE/NON-VOICE DETERMINATION METHOD, VOICE/NON-VOICE DETERMINATION MODEL PARAMETER LEARNING METHOD, AND PROGRAM

(71) Applicant: NIPPON TELEGRAPH AND TELEPHONE CORPORATION, Tokyo (JP)

(72) Inventors: Ryo Masumura, Tokyo (JP); Takanobu Oba, Tokyo (JP); Kiyoaki Matsui, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/628,467

(22) PCT Filed: Jul. 25, 2019

(86) PCT No.: PCT/JP2019/029241
§ 371 (c)(1),
(2) Date: Jan. 19, 2022

(87) PCT Pub. No.: WO2021/014649
PCT Pub. Date: Jan. 28, 2021

(65) Prior Publication Data
US 2022/0277767 A1 Sep. 1, 2022

(51) Int. Cl.
*G10L 25/93* (2013.01)
*G10L 25/78* (2013.01)
(Continued)

(52) U.S. Cl.
CPC .............. *G10L 25/93* (2013.01); *G06N 20/20* (2019.01); *G10L 15/00* (2013.01); *G10L 15/02* (2013.01);
(Continued)

(58) Field of Classification Search
None
See application file for complete search history.

(56) References Cited

U.S. PATENT DOCUMENTS 10,923,137 B2* 2/2021 Hasan al Banna ..... G10L 15/20
2018/0197540 A1* 7/2018 Lee .......................... G10L 15/22

OTHER PUBLICATIONS

Zhang et al. (2013) "Deep belief networks based voice activity detection," IEEE Transactions on Audio, Speech, and Language Processing, vol. 21, No. 4, pp. 697-710.
(Continued)

*Primary Examiner* — Richa Mishra

(57) ABSTRACT

A voice/non-voice determination device robust with respect to an acoustic signal in a high-noise environment is provided. The voice/non-voice determination device includes an acoustic scene classification unit including a first model which receives input of an acoustic signal and outputs acoustic scene information which is information regarding a scene where the acoustic signal is collected, a speech enhancement unit including a second model which receives input of the acoustic signal and outputs speech enhancement information which is information regarding the acoustic signal after enhancement, and a voice/non-voice determination unit including a third model which receives input of the acoustic signal, the acoustic scene information and the speech enhancement information and outputs a voice/non-voice label which is information regarding a label of either a speech section or a non-speech section.

4 Claims, 9 Drawing Sheets

(51) Int. Cl.
*G10L 15/00* (2013.01)
*G10L 15/02* (2006.01)
*G10L 21/0208* (2013.01)
*G06N 20/20* (2019.01)
G06N 3/044 (2023.01)
G06N 3/09 (2023.01)
G10L 17/00 (2013.01)
G10L 25/84 (2013.01)

(52) U.S. Cl.
CPC .......... *G10L 21/0208* (2013.01); *G10L 25/78* (2013.01); *G06N 3/044* (2023.01); *G06N 3/09* (2023.01); *G10L 17/00* (2013.01); *G10L 25/84* (2013.01); *G10L 2015/025* (2013.01)

(56) References Cited

OTHER PUBLICATIONS

Ryant et al. (2013) "Speech activity detection on youtube using deep neural networks," In Proc. Annual Conference of the International Speech Communication Association (INTERSP EECH), pp. 728-731.

Hughes et al. (2013) "Recurrent neural networks for voice activity detection," In Proc. International Conference on Acoustics, Speech, and Signal Processing (ICASSP), pp. 7378-7382.

* cited by examiner

VOICE/NON-VOICE DETERMINATION DEVICE, VOICE/NON-VOICE DETERMINATION MODEL PARAMETER LEARNING DEVICE, VOICE/NON-VOICE DETERMINATION METHOD, VOICE/NON-VOICE DETERMINATION MODEL PARAMETER LEARNING METHOD, AND PROGRAM

Cross-Reference to Related Applications

This application is a U.S. National Stage Application filed under 35 U.S.C. § 371 claiming priority to International Patent Application No. PCT/JP2019/029241, filed on 25 Jul. 2019, the disclosure of which is hereby incorporated herein by reference in its entirety.

TECHNICAL FIELD

The present invention relates to a voice/non-voice determination device which determines a speech section and a non-speech section of an acoustic signal, a voice/non-voice determination model parameter learning device which learns a model parameter for voice/non-voice determination, a voice/non-voice determination method, a voice/non-voice determination model parameter learning method, and a program.

BACKGROUND ART

Voice/non-voice determination is an important element technology in detection of an utterance section and is a technology for determining an acoustic signal as either a speech section or a non-speech section. In detection of an utterance section, an utterance section which is effective in subsequent processing of speech recognition, speaker recognition, language identification and speech keyword detection is detected on the basis of the determined information regarding the speech section and the non-speech section. Typically, an utterance section is detected, after voice/non-voice determination is implemented, by regarding a non-speech section having a short time length (for example, equal to or less than 0.2 seconds) as a "non-speech section within utterance" and regarding a non-speech section having a longer time length as a "non-speech section outside utterance".

Voice/non-voice determination is typically performed using a method for performing voice/non-voice determination for each acoustic signal of each short time frame (for example, 20 msec). The simplest method in voice/non-voice determination is a method for performing voice/non-voice determination by calculating speech power for each short time frame and determining whether the speech power is greater or smaller than a threshold determined by a human in advance. However, power in a non-speech section and power in a speech section are similarly great in a noisy environment, and thus, it is known that such a simple method is not practical.

As a means for performing voice/non-voice determination which is suitable for practical use, a number of methods based on machine learning have been studied. Among these, in recent years, modeling using a deep neural network is known as a powerful method. Outline of this method will be described below. A sequence of acoustic feature amounts for each short time frame is input. While various kinds of information can be used as the acoustic feature amounts, for example, information such as a Mel-frequency cepstral coefficient and a basic frequency can be used. Here, an input acoustic signal is expressed as $(x_1, \ldots, x_T)$, and $x_t$ indicates an acoustic feature amount of the t-th frame. Modeling using the deep neural network in related art is implemented by modeling a generation probability of a voice/non-voice state of each frame. The generation probability of the voice/non-voice state of the t-th frame can be defined with the following expression.

$$P(s_t|x_1, \ldots, x_T; \theta) = \text{VoiceActivityDetection}(x_1, \ldots, x_T; \theta)$$

Here, $(s_1, \ldots, s_T)$ indicates voice/non-voice states corresponding to $(x_1, \ldots, x_T)$, and $s_t$ indicates a state of the t-th frame and has a label of either "speech" or "non-speech". VoiceActivityDetection( ) is a function for performing voice/non-voice determination and can employ an arbitrary network structure from which a generation probability of a voice/non-voice state can be obtained as output. For example, a network for obtaining a generation probability of a state can be constituted by combining a recurrent neural network, a convolutional neural network, or the like, with a softmax layer. For example, technologies of Non-Patent Literature 1, Non-Patent Literature 2 and Non-Patent Literature 3 can be employed. θ is a parameter calculated in advance using a method which will be described later using training data provided in advance, and the parameter substantially depends on definition of the function of VoiceActivityDetection( ). In a case where such modeling is performed, voice/non-voice determination is based on the following expression.

$$\hat{s}_1, \ldots, \hat{s}_T = \underset{s_1,\ldots,s_T}{\operatorname{argmax}} \prod_{t=1}^{T} P(s_t|x_1, \ldots, x_T; \theta) \quad [\text{Math. 1}]$$

Here, $\hat{s}_1, \ldots, \hat{s}_T$ are prediction results of voice/non-voice states (labels).

In related art, a model parameter θ is learned by preparing one or more sets of pair data of an acoustic signal and a correct voice/non-voice state. In a case where a training data set including L pieces of pair data (where L is an integer equal to or greater than 1) is expressed as $C=\{(X_1, S_1), \ldots, (X_L, S_L)\}$, an acoustic signal is expressed as $X_1=(x_{1,1}, \ldots, x_{T1,1})$, and a label sequence of voice/non-voice states is expressed as $S_1=(s_{1,1}, \ldots, s_{T1,1})$, learning is performed by the following standards in related art.

$$\hat{\theta} = \underset{\theta}{\operatorname{argmax}} \sum_{l=1}^{L} \sum_{t=1}^{T_l} \log P(s_{t,l}|x_{1,l}, \ldots, x_{t,l}; \theta) \quad [\text{Math. 2}]$$

Here, $\hat{\theta}$ indicates a model parameter learned on the basis of the training data. Note that while this model parameter estimation problem can be solved using an arbitrary method, for example, optimization using a gradient method can be utilized. Details are disclosed in, for example, Non-Patent Literature 1, Non-Patent Literature 2, and Non-Patent Literature 3.

CITATION LIST

Non-Patent Literature

Non-Patent Literature 1: X.-L. Zhang and J. Wu, "Deep belief networks based voice activity detection," IEEE Transactions on Audio, Speech, and Language Processing, vol. 21, no. 4, pp. 697-710, 2013.

Non-Patent Literature 2: N. Ryant, M. Liberman, and J. Yuan, "Speech activity detection on youtube using deep neural networks," In Proc. Annual Conference of the International Speech Communication Association (INTERSPEECH), pp. 728-731, 2013.

Non-Patent Literature 3: T. Hughes and K. Mierle, "Recurrent neural networks for voice activity detection," In Proc. International Conference on Acoustics, Speech, and Signal Processing (ICASSP), pp. 7378-7382, 2013.

SUMMARY OF THE INVENTION

Technical Problem

A problem in the related art is performance of voice/non-voice determination in a high-noise environment. While performance of voice/non-voice determination of an acoustic signal which includes relatively less noise becomes high by performing learning from pairs of acoustic signals collected in various kinds of noise environments and labels of voice/non-voice states, performance of voice/non-voice determination of an acoustic signal including much noise becomes low. It is known that performance of voice/non-voice determination for an acoustic signal in a high-noise environment, particularly, where a signal to noise ratio is equal to or less than 10 dB is low. This results from difficulty in distinguishing between speech and non-speech (noise) only with information from an input acoustic signal.

It is therefore an object of the present invention to provide a voice/non-voice determination device robust with respect to an acoustic signal in a high-noise environment.

Means for Solving the Problem

A voice/non-voice determination device of the present invention includes an acoustic scene classification unit, a speech enhancement unit, and a voice/non-voice determination unit.

The acoustic scene classification unit includes a first model which receives input of an acoustic signal and outputs acoustic scene information which is information regarding a scene where the acoustic signal is collected and is configured to receive input of the acoustic signal and a parameter of the first model learned in advance and output the acoustic scene information. The speech enhancement unit includes a second model which receives input of the acoustic signal and outputs speech enhancement information which is information regarding the acoustic signal after enhancement and is configured to receive input of the acoustic signal and a parameter of the second model learned in advance and output the speech enhancement information. The voice/non-voice determination unit includes a third model which receives input of the acoustic signal, the acoustic scene information and the speech enhancement information and outputs a voice/non-voice label which is information regarding a label of either a speech section or a non-speech section and is configured to receive input of the acoustic signal, the acoustic scene information, the speech enhancement information and a parameter of the third model learned in advance and output the voice/non-voice label.

Effects of the Invention

A voice/non-voice determination device of the present invention is robust with respect to an acoustic signal in a high-noise environment.

DESCRIPTION OF EMBODIMENTS

Figure 1:
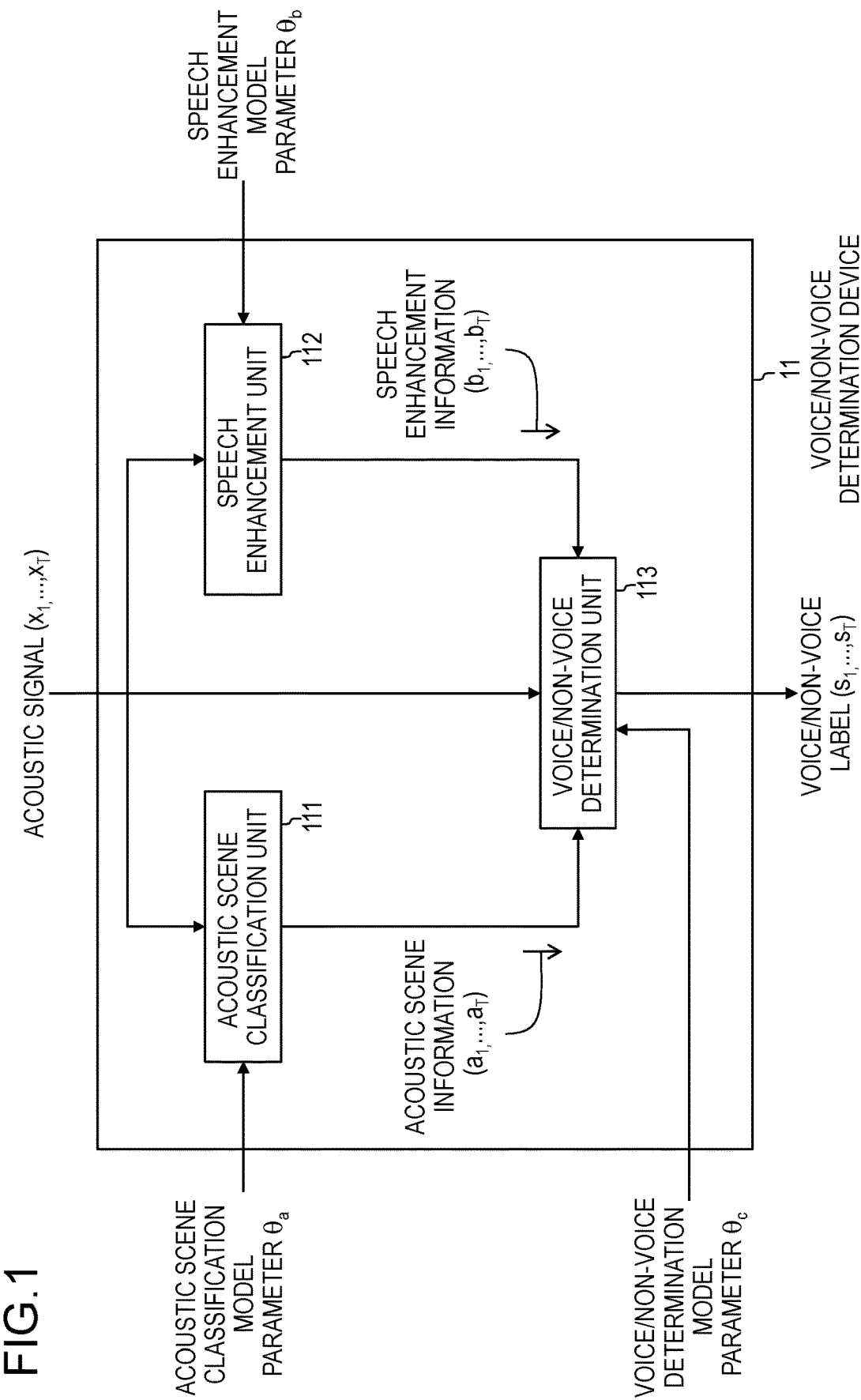
FIG. 1 is a block diagram illustrating a configuration of a voice/non-voice determination device in Embodiment 1.

Embodiments of the present invention will be described in detail below. Note that the same reference numerals will be assigned to components having the same functions, and repetitive description will be omitted.

<Outline of Embodiments>

The following embodiments disclose a voice/non-voice determination device with improved performance of voice/non-voice determination in a high-noise environment.

Points in the following embodiments lie in that acoustic scene classification which is a "technology of determining what sort of place an acoustic signal was collected in" and speech enhancement which is a "technology of estimating an acoustic signal from which noise is removed" are applied to an input acoustic signal at the same time and voice/non-voice determination is performed on the basis of output information from the both. By handling the output information of the acoustic scene classification, it is possible to estimate whether the location is, for example, a platform at the station, in the crowds, or at a factory, so that it is possible to obtain "what kind of noise is generated" as information. This can improve performance of voice/non-voice determination. Further, by handling the output information of the speech enhancement, it is possible to perform voice/non-voice determination while taking into more account speech information buried in noise. Further, by taking into account these kinds of information at the same time, it is possible to provide a voice/non-voice determination device which robustly operates in various noise environments. As a specific effect, it is possible to greatly improve performance of voice/non-voice determination with respect to an acoustic signal in a high-noise environment, particularly, where a signal to noise ratio is equal to or less than 10 dB compared to related art.

Further, the following embodiments disclose a voice/non-voice determination model parameter learning device for implementing voice/non-voice determination while taking into account information regarding the acoustic scene classification and the speech enhancement described above.

Embodiment 1

<Configuration and Operation of Voice/Non-Voice Determination Device 11>

A configuration of a voice/non-voice determination device in Embodiment 1 will be described with reference to FIG. 1. As illustrated in FIG. 1, the voice/non-voice determination device 11 of the present embodiment includes an acoustic scene classification unit 111, a speech enhancement unit 112, and a voice/non-voice determination unit 113.

Figure 2:
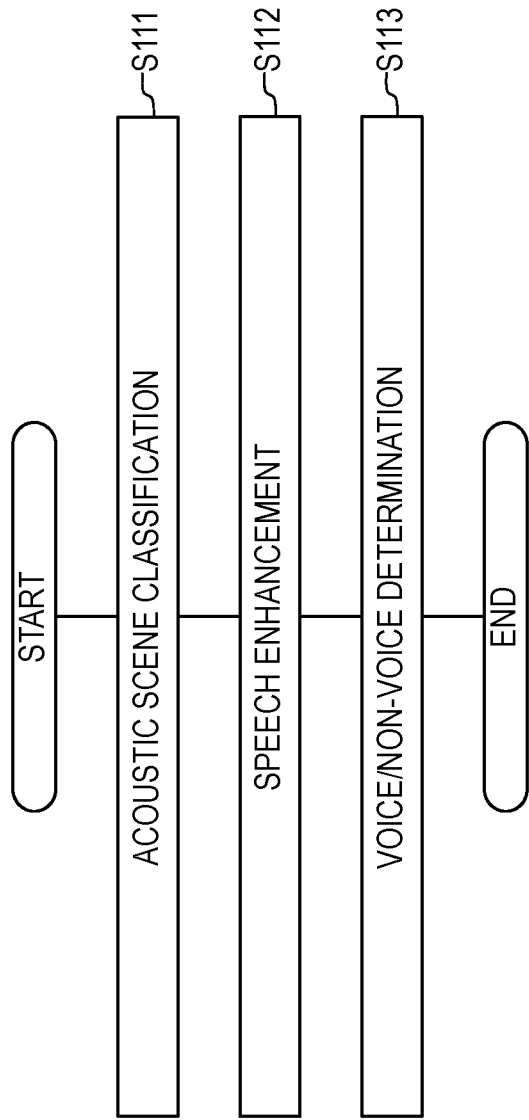
FIG. 2 is a flowchart illustrating operation of the voice/non-voice determination device in Embodiment 1.

Operation of the respective components will be described below with reference to FIG. 2. The acoustic classification unit 111, which includes a first model which receives input of an acoustic signal and outputs acoustic scene information which is information regarding a scene where the acoustic signal is collected, receives input of the acoustic signal and a parameter of the first model learned in advance and outputs the acoustic scene information (S111). The speech enhancement unit 112, which includes a second model which receives input of the acoustic signal and outputs speech enhancement information which is information regarding the acoustic signal after enhancement, receives input of the acoustic signal and a parameter of the second model learned in advance and outputs the speech enhancement information (S112). The voice/non-voice determination unit 113, which includes a third model which receives input of the acoustic signal, the acoustic scene information and the speech enhancement information and outputs a voice/non-voice label which is information regarding a label of either a speech section or a non-speech section, receives input of the acoustic signal, the acoustic scene information, the speech enhancement information and a parameter of the third model learned in advance and outputs the voice/non-voice label (S113). Note that the first, the second and the third models may be models using a DNN or may be arbitrary models using other machine learning, or the like.

Operation of the respective components will be described in further detail below.

<Acoustic Scene Classification Unit 111>

Input: an acoustic signal $(x_1, \ldots, x_T)$, an acoustic scene classification model parameter $\theta_a$ Output: acoustic scene information $(a_1, \ldots, a_T)$ The acoustic scene classification unit 111 estimates the acoustic scene information $(a_1, \ldots, a_T)$ from the acoustic signal $(x_1, \ldots, x_T)$ and the acoustic scene classification model parameter $\theta_a$ (S111). This acoustic scene information is expressed as a vector sequence and has a sequence length which is the same as a sequence length of the acoustic signal. The acoustic scene information can be estimated in accordance with the following expression.

$$(a_1, \ldots, a_T) = \text{AcousticSceneClassification}(x_1, \ldots, x_T; \theta_a)$$

Here, AcousticSceneClassification( ) is a function for outputting a vector sequence of the acoustic scene information from the input acoustic signal. As this function, an arbitrary network to which learning criteria regarding $\theta_a$ which will be described later can be applied can be used, and, for example, a feedforward neural network or a recurrent neural network can be used. How the acoustic scene classification model parameter $\theta_a$ is obtained will be described later in and after a section of <Configuration and operation of voice/non-voice determination model parameter learning device 12>.

<Speech Enhancement Unit 112>

Input: an acoustic signal $(x_1, \ldots, x_T)$, a speech enhancement model parameter $\theta_b$ Output: speech enhancement information $(b_1, \ldots, b_T)$ The speech enhancement unit 112 estimates the speech enhancement information $(b_1, \ldots, b_T)$ from the acoustic signal $(x_1, \ldots, x_T)$ and the speech enhancement model parameter $\theta_b$ (S112). This speech enhancement information is expressed as a vector sequence and has a sequence length which is the same as the sequence length of the acoustic signal. The speech enhancement information can be estimated in accordance with the following expression.

$$(b_1, \ldots, b_T) = \text{SpeechEnhancement}(x_1, \ldots, x_T; \theta_b)$$

Here, SpeechEnhancement( ) is a function for outputting a vector sequence of the speech enhancement information from the input acoustic signal. As this function, an arbitrary network to which learning criteria regarding $\theta_b$ which will be described later can be applied can be used, and, for example, a feedforward neural network or a recurrent neural network can be used. How the speech enhancement model parameter $\theta_b$ is obtained will be described later in and after a section of <Configuration and operation of voice/non-voice determination model parameter learning device 12>.

<Voice/Non-Voice Determination Unit 113>

Input: an acoustic signal $(x_1, \ldots, x_T)$, a voice/non-voice determination model parameter $\theta_c$, acoustic scene information $(a_1, \ldots, a_T)$, speech enhancement information $(b_1, \ldots, b_T)$ Output: a voice/non-voice label $(s_1, \ldots, s_T)$ The voice/non-voice determination unit 113 estimates the voice/non-voice label $(s_1, \ldots, s_T)$ from the input acoustic signal $(x_1, \ldots, x_T)$, the acoustic scene information $(a_1, \ldots, a_T)$, the speech enhancement information $(b_1, \ldots, b_T)$ and the voice/non-voice determination model parameter $\theta_c$ (S113). To achieve this, the voice/non-voice determination unit 113 estimates a voice/non-voice state while taking into account the input acoustic signal, the acoustic scene information and the speech enhancement information at the same time. Specifically, the voice/non-voice determination unit 113 first constitutes a coupled vector of these three elements. A coupled vector sequence is expressed with the following expression.

$$(u_1, \ldots, u_T) = ([x_1, a_1, b_1], \ldots, [x_T, a_T, b_T])$$

A sequence length of this coupled vector sequence is the same as the sequence length of the input acoustic signal. The voice/non-voice determination unit 113 models voice/non-voice determination using this coupled vector sequence in accordance with the following expression.

$$P(s_t|x_1, \ldots, x_T; \theta_a, \theta_b, \theta_c) = \text{SpeechActivityDetection}(u_1, \ldots, u_T; \theta_c)$$

Here, SpeechActivityDetection( ) is a function for generating a probability of a voice/non-voice state sequence from the coupled vector sequence. As this function, an arbitrary network to which learning standards regarding $\theta_c$ which will be described later can be applied can be used, and for example, this function can be achieved by combining a feedforward neural network or a recurrent neural network with a softmax function. In a case where such modeling is performed, voice/non-voice determination is based on the following expression.

$$\hat{s}_1, \ldots, \hat{s}_T = \operatorname*{argmax}_{s_1, \ldots, s_T} \prod_{t=1}^{T} P(s_t|x_1, \ldots, x_T; \theta_a, \theta_b, \theta_c)$$ [Math. 3]

Here, $\hat{s}_1, \ldots, \hat{s}_T$ are voice/non-voice states of prediction results.

<Configuration and Operation of Voice/Non-Voice Determination Model Parameter Learning Device 12>

Figure 3:
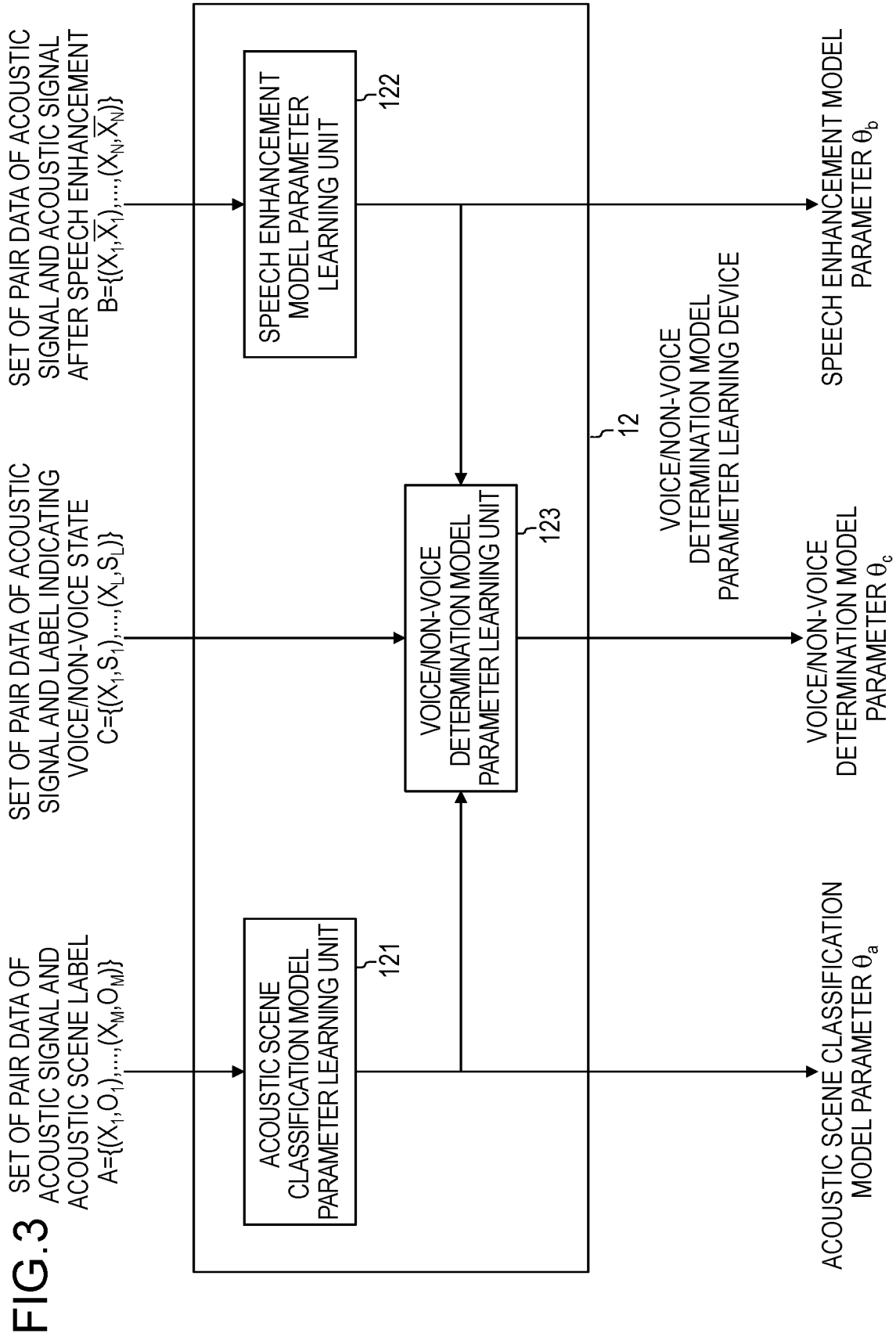
FIG. 3 is a block diagram illustrating a configuration of a voice/non-voice determination model parameter learning device in Embodiment 1.

A configuration of a voice/non-voice determination model parameter learning device of the present embodiment will be described below with reference to FIG. 3. As illustrated in FIG. 3, a voice/non-voice determination model parameter learning device 12 of the present embodiment includes an acoustic scene classification model parameter learning unit 121, a speech enhancement model parameter learning unit 122, and a voice/non-voice determination model parameter learning unit 123.

Figure 4:
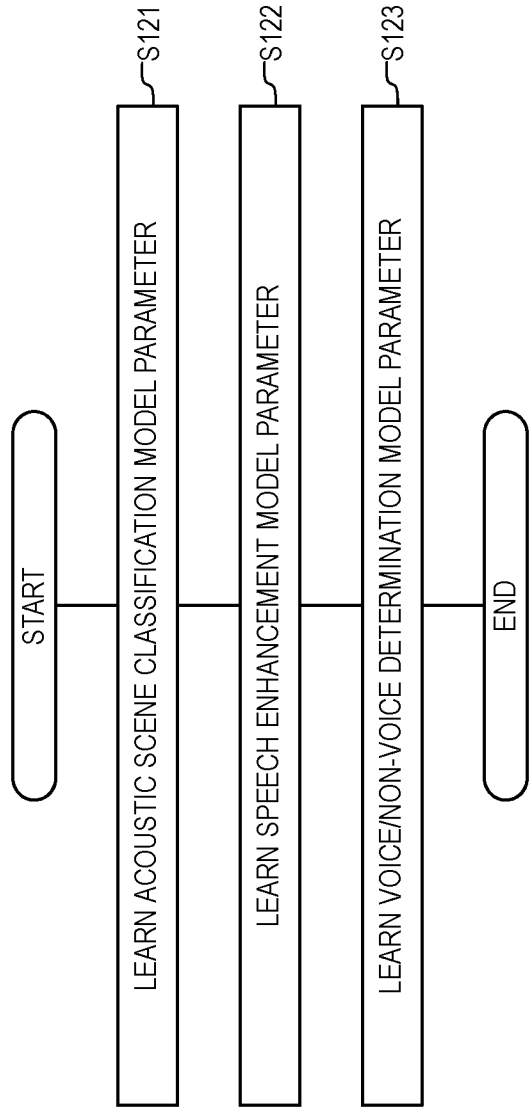
FIG. 4 is a flowchart illustrating operation of the voice/non-voice determination model parameter learning device in Embodiment 1.

Operation of the respective components will be described below with reference to FIG. 4. The acoustic scene classification model parameter learning unit 121 learns a parameter of a first model which is a model for acoustic scene classification using a set of pair data of an acoustic signal and an acoustic scene label which is a label of a scene where the acoustic signal is collected as first training data (S121). The speech enhancement model parameter learning unit 122 learns a parameter of a second model which is a model for speech enhancement using a set of pair data of an acoustic signal and the acoustic signal after speech enhancement as second training data (S122). The voice/non-voice determination model parameter learning unit 123 learns a parameter of a third model which is a model for voice/non-voice determination using a set of pair data of an acoustic signal and a label indicating a voice/non-voice state as third training data, for fourth training data including a total of four pieces of information of acoustic scene information which is output of the first model with respect to the acoustic signal included in the third training data, speech enhancement information which is output of the second model with respect to the acoustic signal included in the third training data, the label included in the third training data and the acoustic signal included in the third training data (S123).

Operation of the respective components will be described in further detail below.

<Acoustic Scene Classification Model Parameter Learning Unit 121>

Input: a set of pair data of an acoustic signal and an acoustic scene label $A=\{(X_1, O_1), \ldots, (X_M, O_M)\}$ Output: an acoustic scene classification model parameter $\theta_a$ The acoustic scene classification model parameter learning unit 121 learns the acoustic scene classification model parameter $\theta_a$ from the set of pair data of the acoustic signal and the acoustic scene label information $A=\{(X_1, O_1), \ldots, (X_M, O_M)\}$ (S121). Here, M is a total number of pieces of pair data and is a value equal to or greater than 1. The acoustic signal is expressed as $X_m=(x_{1,m}, \ldots, x_{Tm,m})$, and a label sequence of acoustic scenes is expressed as $O_m=(o_{1,m}, \ldots, o_{Tm,m})$. Here, $o_{t,m}$ indicates a label of an acoustic scene, which is defined by a human in advance as, for example, "station yard", "crowds" or "silence", and the number of types of labels is equal to or larger than two. For example, an arbitrary label which can be defined from sound information other than utterance such as a location, whether a human is around, whether noise is included, background sound and a degree of echo, can be set. Further, a plurality of labels may be provided to one speech section. In this event, the model parameter is estimated in accordance with the following expression.

$$\hat{\theta}_a = \underset{\theta_a}{\operatorname{argmax}} \sum_{n=1}^{N} \sum_{t=1}^{T_m} \log P(o_{t,m}|x_{1,m}, \ldots, x_{t,m}; \theta_a) \quad \text{[Math. 4]}$$

Here, $\hat{\theta}_a$ indicates the acoustic scene classification model parameter estimated on the basis of the training data. This model parameter estimation problem can be solved using an arbitrary method, and, for example, optimization using a gradient method can be utilized. In the present embodiment, two types of model definition can be used as $P(o_{t,m}|x_{1,m}, \ldots, x_{t,m};\theta_a)$. The first type is model definition as follows.

$P(o_{t,m}|x_{1,m}, \ldots, x_{t,m};\theta_a)$=AcousticSceneClassification$(x_{1,m}, \ldots, x_{t,m};\theta_a)$ In this event, an output vector sequence of AcousticSceneClassification( ) is expressed as a sequence of discrete probability distribution for acoustic scenes of respective frames. The second type is model definition as follows.

$P(o_{t,m}|x_{1,m}, \ldots, x_{t,m};\theta_a)$=Posterior(AcousticSceneClassification$(x_{1,m}, \ldots, x_{t,m};\theta_a);\theta_a)$ Here, Posterior( ) is a function for converting the output vector sequence of AcousticSceneClassification( ) into a sequence of discrete probability distribution for acoustic scenes of respective frames. As Posterior( ), an arbitrary function which can convert a vector sequence into a sequence of discrete probability distribution can be used, and, for example, a linear transformation function using a softmax function can be used.

<Speech Enhancement Model Parameter Learning Unit 122>

Input: a set of pair data of an acoustic signal and an acoustic signal after speech enhancement $B=\{(X_1, X_{-1}), \ldots, (X_N, X_{-N})\}$ Output: a speech enhancement model parameter $\theta_b$ The speech enhancement model parameter learning unit 122 learns the speech enhancement model parameter $\theta_b$ from the set of pair data of the acoustic signal and the acoustic signal after speech enhancement $B=\{(X_1, X_{-1}), \ldots, (X_N, X_{-N})\}$ (S122). Here, N is a total number of pieces of pair data and is a value equal to or greater than 1. The acoustic signal is expressed as $X_n=(x_{1,n}, \ldots, x_{Tn,n})$ and the acoustic signal after speech enhancement is expressed as $X_{-n}=(x_{-1,n}, \ldots, x_{-Tn,n})$. The model parameter is estimated in accordance with the following expression.

$$\hat{\theta}_b = \underset{\theta_b}{\operatorname{argmin}} \sum_{n=1}^{N} \sum_{t=1}^{T_n} \|\bar{x}_{t,n} - f(x_{1,n}, \ldots, x_{t,n}; \theta_b)\|^2 \quad \text{[Math. 5]}$$

Here, $\hat{\theta}_b$ indicates the speech enhancement model parameter estimated on the basis of the training data. This model parameter estimation problem can be solved using an arbitrary method, and, for example, optimization using a gradient method can be utilized. In the present embodiment, as $f(x_{1,n}, \ldots, x_{t,n};\theta_b)$, two types of model definition can be used. The first type is model definition as follows.

$f(x_{1,n}, \ldots, x_{t,n};\theta_b)$=SpeechEnhancement$(x_{1,n}, \ldots, x_{t,n};\theta_b)$ In this event, an output vector sequence of SpeechEnhancement( ) is expressed as a sequence of an acoustic signal after speech enhancement of respective frames. The second type is model definition as follows.

$$f(x_{1,n}, \ldots, x_{t,n}; \theta_b) = \text{Post}(\text{SpeechEnhancement}(x_{1,n}, \ldots, x_{t,n}; \theta_b); \theta_b)$$

In this event, Post( ) is a function for converting the output vector sequence of SpeechEnhancement( ) into a sequence of an acoustic signal after speech enhancement of respective frames. As Post( ), an arbitrary function which can convert a vector sequence into a vector sequence can be used, and, for example, a simple linear transformation function can be used.

<Voice/Non-Voice Determination Model Parameter Learning Unit 123>

Input: a set of pair data of an acoustic signal and a label indicating a voice/non-voice state C={($X_1$, $S_1$), . . . , ($X_L$, $S_L$)}, an acoustic scene classification model parameter $\theta_a$, a speech enhancement model parameter $\theta_b$, Output: A Voice/Non-voice Determination Model Parameter $\theta_c$ The voice/non-voice determination model parameter learning unit 123 estimates the voice/non-voice determination model parameter $\theta_c$ from the set of pair data of the acoustic signal and the voice/non-voice state (label) C={($X_1$, $S_1$), . . . , ($X_L$, $S_L$)}, the acoustic scene classification model parameter $\theta_a$ and the speech enhancement model parameter $\theta_b$. Here, L indicates the number of pieces of pair data of the acoustic signal and the label indicating the voice/non-voice state and is equal to or greater than 1. The acoustic signal is expressed as $X_l = (x_{1,l}, \ldots, x_{T_l,l})$, and a sequence of the labels of the voice/non-voice states is expressed as $S_l = (s_{1,l}, \ldots, s_{T_l,l})$. In this event, the voice/non-voice determination model parameter can be estimated in accordance with the following expression.

$$\hat{\theta}_c = \underset{\theta_c}{\text{argmax}} \sum_{l=1}^{L} \sum_{t=1}^{T_l} \log P(s_{t,l} | x_{1,l}, \ldots, x_{t,1}; \theta_a, \theta_b, \theta_c) \quad [\text{Math. 6}]$$

Here, $\hat{\theta}_c$ indicates the voice/non-voice determination model parameter estimated on the basis of training data. This model parameter estimation problem can be solved using an arbitrary method, and, for example, optimization using a gradient method can be utilized.

Embodiment 2

While in the above-described embodiment, the acoustic scene information and the speech enhancement information are used, besides this, in a case of "operation of outputting a vector sequence having the same sequence length from an acoustic signal", it is possible to employ a configuration where the output information is used in addition to the acoustic scene classification information and the speech enhancement information.

For example, it is possible to employ a configuration where phonemes are caused to be recognized from the input acoustic signal and phoneme recognition information is additionally used, or a configuration where speakers are caused to be recognized from the input acoustic signal and speaker recognition information is additionally used. Embodiment 2 is a configuration example where the acoustic scene information, the speech enhancement information, the phoneme recognition information and the speaker recognition information are used for voice/non-voice determination.

<Configuration and Operation of Voice/Non-Voice Determination Device 21>

Figure 5:
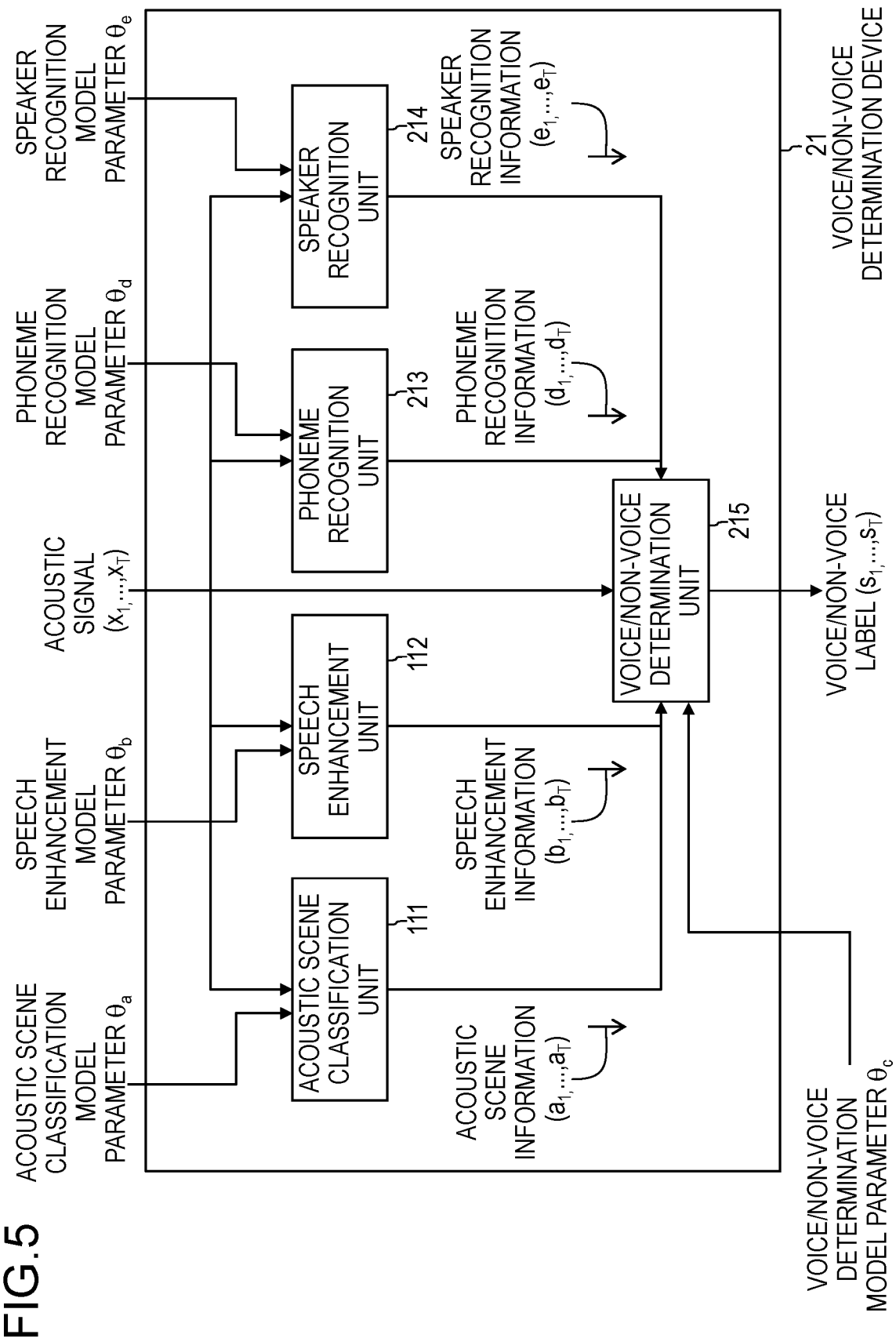
FIG. 5 is a block diagram illustrating a voice/non-voice determination device in Embodiment 2.

A configuration of a voice/non-voice determination device in Embodiment 2 will be described with reference to FIG. 5. As illustrated in FIG. 5, a voice/non-voice determination device 21 in the present embodiment includes the acoustic scene classification unit 111, the speech enhancement unit 112, a phoneme recognition unit 213, a speaker recognition unit 214 and a voice/non-voice determination unit 215, and the acoustic scene classification unit 111 and the speech enhancement unit 112 are the same as those in Embodiment 1. Note that in FIG. 5, the phoneme recognition information is expressed as ($d_1$, . . . , $d_T$), the speaker recognition information is expressed as ($e_1$, . . . , $e_T$), a phoneme recognition model parameter is expressed as $\theta_d$, and a speaker recognition model parameter is expressed as $\theta_e$.

Figure 6:
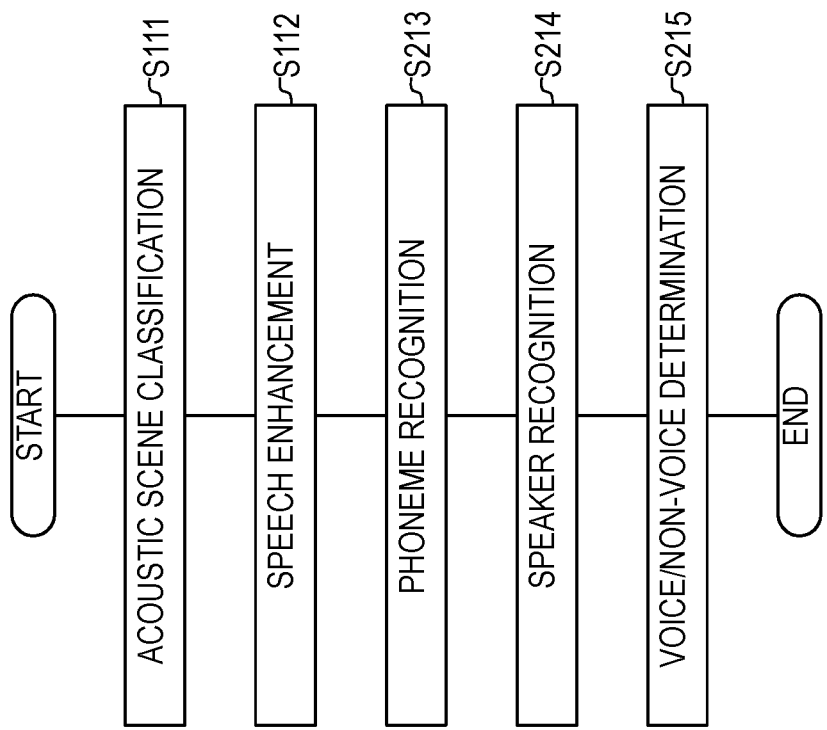
FIG. 6 is a flowchart illustrating operation of the voice/non-voice determination device in Embodiment 2.

Operation of the respective components which are different from those in Embodiment 1 will be described below with reference to FIG. 6.

The phoneme recognition unit 213, which includes a fourth model which receives input of an acoustic signal and outputs phoneme recognition information which is information regarding a phoneme recognition result of the acoustic signal, receives input of the acoustic signal and a parameter of the fourth model learned in advance and outputs the phoneme recognition information (S213). The speaker recognition unit 214, which includes a fifth model which receives input of an acoustic signal and outputs speaker recognition information which is information regarding a speaker recognition result of the acoustic signal, receives input of the acoustic signal and a parameter of the fifth model learned in advance and outputs the speaker recognition information (S214).

Note that the fourth and the fifth models may be models using a DNN or may be arbitrary models using other machine learning, or the like.

Here, the third model which is a model for voice/non-voice determination is a model which receives input of the acoustic scene information, the speech enhancement information, the phoneme recognition information and the speaker recognition information and outputs a voice/non-voice label.

The voice/non-voice determination unit 215 receives input of the acoustic signal, the acoustic scene information, the speech enhancement information, the phoneme recognition information, the speaker recognition information and the parameter of the third model learned in advance and outputs the voice/non-voice label (S215).

Note that either one of the phoneme recognition unit 213 or the speaker recognition unit 214 may be omitted. In a case where the phoneme recognition unit 213 is omitted, the third model is a model which receives input of the acoustic signal, the acoustic scene information, the speech enhancement information and the speaker recognition information and outputs a voice/non-voice label, and the voice/non-voice determination unit 215 receives input of the acoustic signal, the acoustic scene information, the speech enhancement information, the speaker recognition information and the parameter of the third model learned in advance and outputs the voice/non-voice label. In a case where the speaker recognition unit 214 is omitted, the third model is a model which receives input of the acoustic signal, the acoustic scene information, the speech enhancement information and the phoneme recognition information and outputs a voice/non-voice label, and the voice/non-voice determination unit 215 receives input of the acoustic signal, the acoustic scene information, the speech enhancement information, the phoneme recognition information and the parameter of the third model learned in advance and outputs the voice/non-voice label.

<Configuration and Operation of Voice/Non-Voice Determination Model Parameter Learning Device 22>

Figure 7:
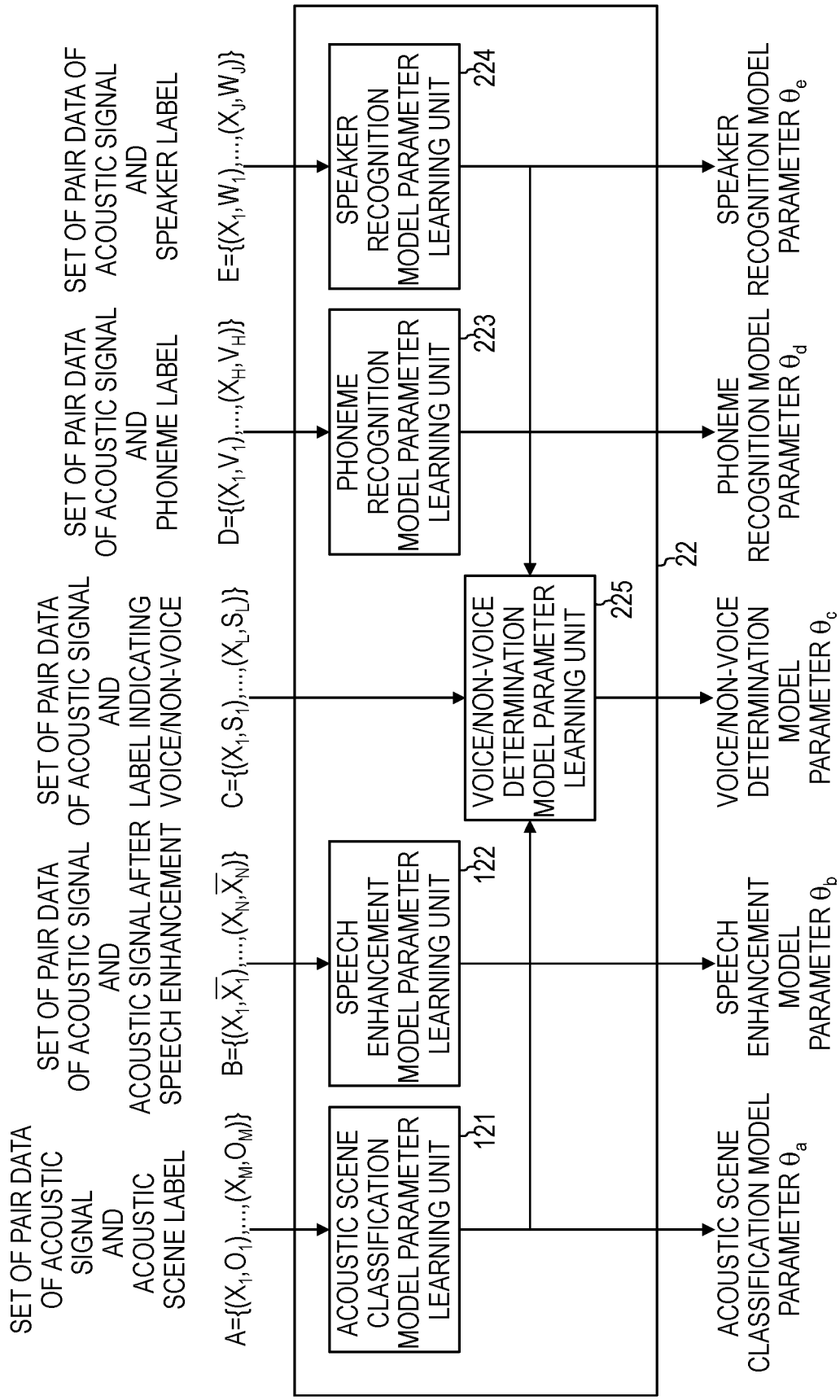
FIG. 7 is a block diagram illustrating a configuration of a voice/non-voice determination model parameter learning device in Embodiment 2.

A configuration of a voice/non-voice determination model parameter learning device in Embodiment 2 will be described with reference to FIG. 7. As illustrated in FIG. 7, a voice/non-voice determination model parameter learning device 22 in the present embodiment includes the acoustic scene classification model parameter learning unit 121, the speech enhancement model parameter learning unit 122, a phoneme recognition model parameter learning unit 223, a speaker recognition model parameter learning unit 224 and a voice/non-voice determination model parameter learning unit 225, and the acoustic scene classification model parameter learning unit 121 and the speech enhancement model parameter learning unit 122 are the same as those in Embodiment 1. Note that in FIG. 7, a set of pair data of an acoustic signal and a phoneme label is expressed as $D=\{(X_1, V_1), \ldots, (X_H, V_H)\}$, and a set of pair data of an acoustic signal and a speaker label is expressed as $E=\{(X_1, W_1), \ldots, (X_J, W_J)\}$.

Figure 8:
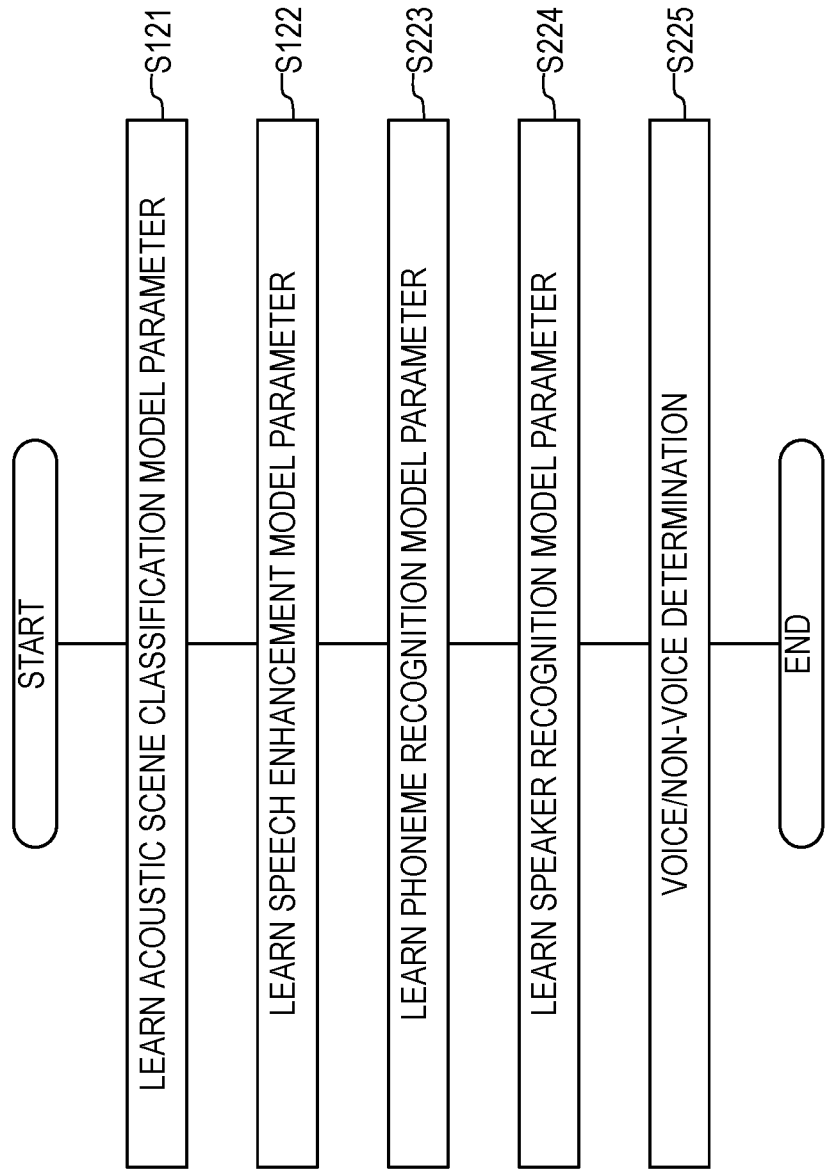
FIG. 8 is a flowchart illustrating operation of the voice/non-voice determination model parameter learning device in Embodiment 2.

Operation of the respective components which are different from those in Embodiment 1 will be described below with reference to FIG. 8.

The phoneme recognition model parameter learning unit 223 learns a parameter of the fourth model which is a model for phoneme recognition using a set of pair data of an acoustic signal and a phoneme label of the acoustic signal as fifth training data (S223).

The speaker recognition model parameter learning unit 224 learns a parameter of the fifth model which is a model for speaker recognition using a set of pair data of an acoustic signal and a speaker label of the acoustic signal as sixth training data (S224).

The voice/non-voice determination model parameter learning unit 225 learns a parameter of the third model which outputs a voice/non-voice label for seventh training data including a total of six pieces of information of the acoustic scene information which is output of the first model with respect to the acoustic signal included in the third training data, the speech enhancement information which is output of the second model with respect to the acoustic signal included in the third training data, the label included in the third training data, the acoustic signal included in the third training data, the phoneme recognition information which is output of the fourth model with respect to the acoustic signal included in the third training data, and the speaker recognition information which is output of the fifth model with respect to the acoustic signal included in the third training data (S225).

Note that either one of the phoneme recognition model parameter learning unit 223 or the speaker recognition model parameter learning unit 224 may be omitted.

While in the present embodiment, the phoneme recognition information and the speaker recognition information are added, besides this, information regarding gender, age, feeling, or the like, may be used, and arbitrary information can be used as long as "operation of outputting a vector sequence having the same sequence length from an acoustic signal" can be performed.

<Additional Information>

The device of the present invention includes an input unit to which a keyboard, or the like, can be connected, an output unit to which a liquid crystal display, or the like, can be connected, a communication unit to which a communication device (for example, a communication cable) which can perform communication with outside of hardware entity can be connected, a CPU (Central Processing Unit, which may include a cache memory, a register, or the like), a RAM and a ROM which are memories, an external storage device which is a hard disk, and a bus which connects these input unit, output unit, communication unit, CPU, RAM, ROM, and external storage device so as to be able to exchange data among them, for example, as single hardware entity. Further, as necessary, it is also possible to provide a device (drive), or the like, which can perform read/write to/from a recording medium such as a CD-ROM, at the hardware entity. Examples of physical entity including such hardware resources can include a general-purpose computer.

At the external storage device of the hardware entity, a program which is necessary for implementing the above-described functions and data, or the like, which are necessary for processing of this program are stored. The device is not limited to the external storage device, and, a program may be stored in, for example, a ROM which is a read-only storage device. Further, data, or the like, obtained through processing of these programs are stored in a RAM, an external storage device, or the like, as appropriate.

At the hardware entity, each program stored in the external storage device (or the ROM, or the like), and data necessary for processing of each program are read to a memory as necessary, and interpretive execution and processing are performed at the CPU as appropriate. As a result, the CPU implements predetermined functions (respective components indicated above as units, means, or the like).

The present invention is not limited to the above-described embodiments and can be changed as appropriate within the scope not deviating from the gist of the present invention. Further, the processing described in the above-described embodiments may be executed parallelly or individually in accordance with processing performance of devices which execute processing or as necessary as well as being executed in chronological order in accordance with description order.

As described above, in a case where the processing functions at the hardware entity (the device of the present invention) described in the above-described embodiments are implemented with a computer, processing content of the functions which should be provided at the hardware entity is described with a program. Then, by this program being executed by the computer, the processing functions at the hardware entity described above are implemented on a computer.

Figure 9:
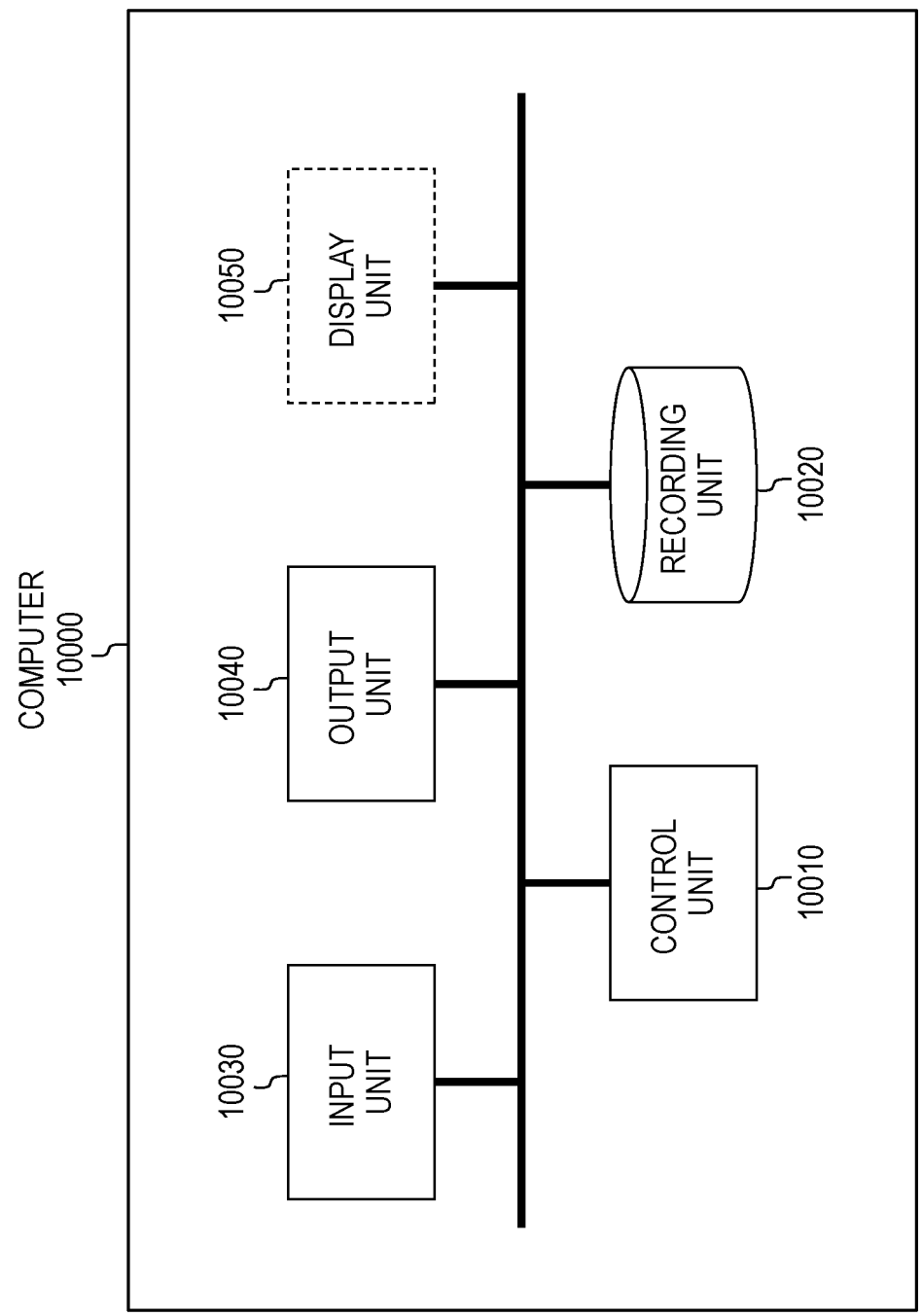
FIG. 9 is a view illustrating a functional configuration example of a computer.

The above-described various kinds of processing can be implemented by a program for executing each step of the above-described method being loaded in a recording unit 10020 of the computer illustrated in FIG. 9 and causing a control unit 10010, an input unit 10030 and an output unit 10040 to operate.

The program describing this processing content can be recorded in a computer-readable recording medium. As the computer-readable recording medium, for example, any medium such as a magnetic recording device, an optical disk, a magnetooptical recording medium and a semiconductor memory may be used. Specifically, for example, it is possible to use a hard disk device, a flexible disk, a magnetic tape, or the like, as the magnetic recording device, and use a DVD (Digital Versatile Disc), a DVD-RAM (Random Access Memory), a CD-ROM (Compact Disc Read Only Memory), a CD-R (Recordable)/RW (ReWritable), or the like, as the optical disk, use an MO (Magneto-Optical disc), or the like, as the magnetooptical recording medium, and use an EEP-ROM (Electrically Erasable and Programmable-Read Only Memory), or the like, as the semiconductor memory.

Further, this program is distributed by, for example, a portable recording medium such as a DVD and a CD-ROM in which the program is recorded being sold, given, lent, or the like. Still further, it is also possible to employ a configuration where this program is distributed by the program being stored in a storage device of a server computer and transferred from the server computer to other computers via a network.

A computer which executes such a program, for example, first, stores a program recorded in the portable recording medium or a program transferred from the server computer in the storage device of the own computer once. Then, upon execution of the processing, this computer reads the program stored in the storage device of the own computer and executes the processing in accordance with the read program. Further, as another execution form of this program, the computer may directly read a program from the portable recording medium and execute the processing in accordance with the program, and, further, sequentially execute the processing in accordance with the received program every time the program is transferred from the server computer to this computer. Further, it is also possible to employ a configuration where the above-described processing is executed by so-called ASP (Application Service Provider) type service which implements processing functions only by an instruction of execution and acquisition of a result without the program being transferred from the server computer to this computer. Note that, it is assumed that the program in this form includes information which is to be used for processing by an electronic computer, and which is equivalent to a program (not a direct command to the computer, but data, or the like, having property specifying processing of the computer).

Further, while, in this form, the hardware entity is constituted by a predetermined program being executed on the computer, at least part of the processing content may be implemented with hardware.

The invention claimed is:

1. A voice/non-voice determination device comprising: processing circuitry configured to:
receive signal data as acoustic signal;
include a first model which receives input of the acoustic signal and outputs acoustic scene information which is information regarding, represented in a sequence of a plurality of vector data, a scene where the acoustic signal is collected and configured to receive input of the acoustic signal and a parameter of the first model learned in advance and output the acoustic scene information;
include a second model which receives input of the acoustic signal and outputs speech enhancement information which is information regarding the acoustic signal after enhancement and configured to receive input of the acoustic signal and a parameter of the second model learned in advance and output the speech enhancement information;
include a third model which receives input of the acoustic signal, the acoustic scene information and the speech enhancement information and outputs a voice/non-voice label which is information regarding a label of either a speech section or a non-speech section and configured to receive input of the acoustic signal, the acoustic scene information, the speech enhancement information and a parameter of the third model learned in advance and output the voice/non-voice label;
include a fourth model which receives input of the acoustic signal and outputs phoneme recognition information which is information regarding a phoneme recognition result of the acoustic signal and configured to receive input of the acoustic signal and a parameter of the fourth model learned in advance and output the phoneme recognition information;
wherein the third model is a model which receives input of the acoustic signal, the acoustic scene information, the speech enhancement information and the phoneme recognition information and outputs the voice/non-voice label;
receive input of the acoustic signal, the acoustic scene information, the speech enhancement information, the phoneme recognition information and the parameter of the third model learned in advance and output the voice/non-voice label; and
cause outputting a result of speech recognition data associated with the acoustic signal according to the voice/non-voice label as output from the third model and the phoneme recognition information as output from the fourth model.

2. A voice/non-voice determination model parameter learning device comprising:
processing circuitry configured to:
receive a set of pair data of an acoustic signal and acoustic scene label which is a label of a scene where the acoustic signal is collected as first training data;
receive a set of pair data of the acoustic signal and the acoustic signal after speech enhancement as second training data;
receive a set of pair data of the acoustic signal and a label indicating a voice/non-voice state as third training data;
learn a parameter of a first model which is a model for acoustic scene classification using the first training data;
learn a parameter of a second model which is a model for speech enhancement using the second training data;
learn a parameter of a third model which is a model for voice/non-voice determination using the third training data, for fourth training data including a total of four pieces of information of acoustic scene information which is output of the first model with respect to the acoustic signal included in the third training data, speech enhancement information which is output of the second model with respect to the acoustic signal included in the third training data, the label included in the third training data, and the acoustic signal included in the third training data:
learn a parameter of a fourth model which is a model for phoneme recognition using a set of pair data of the acoustic signal and a phoneme label of the acoustic signal as fifth training data;
learn a parameter of a fifth model which is a model for speaker recognition using a set of pair data of the acoustic signal and a speaker label of the acoustic signal as sixth training data,
wherein the processing circuitry learns the parameter of the third model for seventh training data including a total of six pieces of information of the acoustic scene information, the speech enhancement information, the label included in the third training data, the acoustic signal included in the third training data, phoneme recognition information which is output of the fourth model with respect to the acoustic signal included in the third training data, and speaker recognition information which is output of the fifth model with respect to the acoustic signal included in the third training data; and cause outputting a result of speech recognition data associated with the acoustic signal according to the voice/non-voice label as output from the third model and the phoneme recognition information as output from the fourth model.

3. A non-transitory computer readable medium storing a computer program for causing a computer to function as the device according to claim 1.

4. A non-transitory computer readable medium storing a computer program for causing a computer to function as the device according to claim 2.

\* \* \* \* \*